United States Patent
Chen et al.

(10) Patent No.: US 12,315,902 B2
(45) Date of Patent: May 27, 2025

(54) BATTERY HEATING CONTROL METHOD AND APPARATUS, AND ELECTRONIC DEVICE

(71) Applicant: CONTEMPORARY AMPEREX TECHNOLOGY (HONG KONG) LIMITED, Hong Kong (CN)

(72) Inventors: Wei Chen, Ningde (CN); Xiaojian Huang, Ningde (CN); Yuanmiao Zhao, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 540 days.

(21) Appl. No.: 17/886,228

(22) Filed: Aug. 11, 2022

(65) Prior Publication Data

US 2023/0207915 A1 Jun. 29, 2023

Related U.S. Application Data

(63) Continuation of application No. PCT/CN2022/089795, filed on Apr. 28, 2022.

(30) Foreign Application Priority Data

Dec. 27, 2021 (CN) .......................... 202111616541.3

(51) Int. Cl.
*H01M 10/615* (2014.01)
*H01M 10/625* (2014.01)
*H01M 10/63* (2014.01)

(52) U.S. Cl.
CPC ....... *H01M 10/615* (2015.04); *H01M 10/625* (2015.04); *H01M 10/63* (2015.04); *H01M 2220/20* (2013.01)

(58) Field of Classification Search
CPC .. H01M 10/615; H01M 10/625; H01M 10/63; H01M 2220/20
(Continued)

(56) References Cited

U.S. PATENT DOCUMENTS 10,957,950 B1  3/2021 Hou et al.
11,502,350 B2 * 11/2022 Yao ..................... H01M 10/486
(Continued)

FOREIGN PATENT DOCUMENTS

CN   102074761 A   5/2011
CN   106183849 A   12/2016
(Continued)

OTHER PUBLICATIONS

The European Patent Office (EPO) First Office Action for Application No. 22747238.8 Jul. 5, 2024 10 Pages.
(Continued)

*Primary Examiner* — Nathaniel R Pelton
(74) *Attorney, Agent, or Firm* — ANOVA LAW GROUP, PLLC

(57) ABSTRACT

A battery heating control method includes collecting a battery parameter of a battery module, in response to the battery parameter of the battery module meeting a preset heating condition, controlling a traction battery and a feed battery of the battery module to charge and discharge each other so that the battery module is heated through mutual charge and discharge of the traction battery and the feed battery, and controlling the traction battery of the battery module to power a motor of a vehicle.

16 Claims, 8 Drawing Sheets

(58) Field of Classification Search
USPC .......................................................... 320/109
See application file for complete search history.

(56) References Cited

U.S. PATENT DOCUMENTS

| | | | | |
|---|---|---|---|---|
| 11,764,410 | B2* | 9/2023 | David | B60L 1/02 |
| | | | | 429/62 |
| 2009/0179636 | A1 | 7/2009 | Chen | |
| 2009/0315518 | A1 | 12/2009 | Soma et al. | |

FOREIGN PATENT DOCUMENTS

| | | |
|---|---|---|
| CN | 106608195 A | 5/2017 |
| CN | 105762434 B | 12/2018 |
| CN | 109301366 A | 2/2019 |
| CN | 111029667 A | 4/2020 |
| CN | 111162351 A | 5/2020 |
| CN | 112224092 A | 1/2021 |
| CN | 113745700 A | 12/2021 |
| CN | 113752908 A | 12/2021 |
| JP | 2003092805 A | 3/2003 |
| JP | 2008060047 A | 3/2008 |
| JP | 2014238966 A | 12/2014 |
| JP | 2017216785 A | 12/2017 |
| JP | 2018042341 A | 3/2018 |
| JP | 2020519223 A | 6/2020 |
| JP | 2021093845 A | 6/2021 |
| KR | 20190060497 A | 6/2019 |
| KR | 20210133029 A | 11/2021 |
| WO | 2013140894 A1 | 9/2013 |
| WO | 2020049943 A1 | 3/2020 |

OTHER PUBLICATIONS

The Japan Patent Office (JPO) Notice of Reasons for Refusal for Application No. 2022-548744 Aug. 6, 2024 6 Pages(including translation).

Korean Intellectual Property Office (KIPO) Written Decision on Registration for Application No. 10-2022-7027732 May 21, 2024 7 Pages (including translation).

The European Patent Office (EPO) The Extended European Search Report for Application No. 22747238.8 Nov. 15, 2023 11 Pages.

Korean Intellectual Property Office (KIPO) Request for the Submission of an Opinion for Application No. 10-2022-7027732 Nov. 25, 2023 15 Pages (including translation).

The Japan Patent Office (JPO) Notification of Reasons for Refusal for Application No. 2022-548744 and Translation Mar. 5, 2024 14 Pages.

The World Intellectual Property Organization (WIPO) International Search Report and written opinion for PCT/CN2022/089795 Sep. 6, 2022 13 pages (including English translation).

The China National Intellectual Property Administration (CNIPA) Notice of the first review opinion for CN Application No. 202111616541.3 Apr. 13, 2023 11 Pages (including English translation).

The China National Intellectual Property Administration (CNIPA) Notice of the second review opinion for CN Application No. 202111616541.3 Jun. 9, 2023 12 Pages (including English translation).

The China National Intellectual Property Administration (CNIPA) First Search Report of priority application for CN Application No. 202111616541.3 Apr. 13, 2023 5 pages (including English translation).

The China National Intellectual Property Administration (CNIPA) Supplementary Search of priority application for CN Application No. 202111616541.3 Apr. 13, 2023 4 Pages (including English translation).

The China National Intellectual Property Administration (CNIPA) Rejection Decision of priority application for CN Application No. 202111616541.3 Aug. 21, 2023 13 pages(including English translation).

* cited by examiner

BATTERY HEATING CONTROL METHOD AND APPARATUS, AND ELECTRONIC DEVICE

CROSS-REFERENCE TO RELATED APPLICATIONS

This application is a continuation of International Application No. PCT/CN2022/089795, filed on Apr. 28, 2022, which claims priority to Chinese Patent Application No. 202111616541.3, filed on Dec. 27, 2021 and entitled "BATTERY HEATING CONTROL METHOD AND APPARATUS, AND ELECTRONIC DEVICE", the entire contents of both of which are incorporated herein by reference.

TECHNICAL FIELD

This application relates to the technical field of batteries and particularly to a battery heating control method and apparatus and an electronic device.

BACKGROUND

Energy conservation and emission reduction is the key to sustainable development of the automobile industry, and electric vehicles have become an important part in sustainable development of the automobile industry by virtue of their advantages in energy conservation and environmental protection. Battery technologies are also an important factor for the development of electric vehicles.

Batteries of electric vehicles have a problem of poor discharge performance in a low temperature environment. In order to resolve the problem, at present, batteries of vehicles are usually heated in advance in low temperature environments and the vehicles are driven after their batteries are heated. In such a manner, vehicles can be used only when their batteries are heated in advance, resulting in poor convenience of use. Therefore, user experience of the vehicles is poor.

SUMMARY

In view of the above problems, this application provides a battery heating control method and apparatus and an electronic device, which can resolve the present problem of poor convenience of vehicle use in low temperature environments due to the need to heat batteries in advance.

In a first aspect, this application provides a battery heating control method. The method includes: collecting a battery parameter of a battery module; when the battery parameter of the battery module meets a preset heating condition, controlling a traction battery and a feed battery of the battery module to charge and discharge each other so that the battery module is heated through mutual charge and discharge of the traction battery and the feed battery; and controlling the traction battery of the battery module to power a motor of a vehicle so that the vehicle runs.

In the technical solution of the embodiments of this application, when the battery parameter of the battery module meets the preset heating condition, the traction battery and the feed battery of the battery module are controlled to charge and discharge each other. As the traction battery and the feed battery both have internal resistance, the mutual charge and discharge of the traction battery and the feed battery causes their internal resistance to produce thermal energy so as to heat the battery module. With this technical solution, the traction battery is used to power the motor of the vehicle during battery heating so that the vehicle runs. That is, the technical solution provides a scheme and effects of battery self-heating during vehicle driving, resolving the present problem of poor convenience of vehicle use in low temperature environments due to the need to heat batteries in advance. Particularly, the safety of vehicle use in low temperature environments is guaranteed while the convenience of vehicle use is also improved.

In some embodiments, the controlling a traction battery and a feed battery of the battery module to charge and discharge each other includes: controlling one of the traction battery and the feed battery of the battery module to discharge to an energy storage element so as to charge the energy storage element; and controlling the energy storage element to charge the other one of the traction battery and the feed battery. According to the embodiments of this application, the energy storage element serves as an intermediate element in the charge and discharge process to implement the mutual charge and discharge of the traction battery and the feed battery, so that self-heating of the battery module can be realized based on existing components and a simple and easy to use technical solution.

In some embodiments, the controlling the energy storage element to charge the other one of the traction battery and the feed battery includes: after charging of the energy storage element has been completed, controlling the energy storage element to charge the other one of the traction battery and the feed battery. In the embodiments of this application, the energy storage element is controlled to charge the battery after charging of the energy storage element has been completed, so as to control the charging timing and power level of the battery by controlling the energy storage element.

In some embodiments, the motor of the vehicle includes a first motor and a second motor, where the traction battery powers the second motor so that the vehicle runs, and a stator inductor of the first motor is the energy storage element. The embodiments of this application can also be applied to dual-motor vehicles, where a stator inductor of one of the motors serves as an energy storage element and the other one of the motors provides traction to the vehicle. The use of an existing stator inductor of a motor as an energy storage element saves the provision of a separate energy storage element while assuring the scheme of battery self-heating during driving, lowering the costs of circuitry design and saving the cost of an energy storage element.

In some embodiments, the controlling a traction battery and a feed battery of the battery module to charge and discharge each other includes: obtaining a discharge effective value of the traction battery and a discharge effective value of the feed battery; calculating a traction discharge duration corresponding to the traction battery and a feed discharge duration corresponding to the feed battery based on the discharge effective value of the traction battery and the discharge effective value of the feed battery; during discharging of the traction battery, controlling the traction battery to release electric energy for the traction discharge duration; and during discharging of the feed battery, controlling the feed battery to release electric energy for the feed discharge duration. In the embodiments of this application, the discharge duration of the traction battery and that of the feed battery are controlled, thus equalizing current of the traction battery and the feed battery.

In some embodiments, the controlling a traction battery and a feed battery of the battery module to charge and discharge each other includes: obtaining a motor feed current and an initial discharge effective value of the feed battery; calculating a discharge adjustment value for the feed battery based on the motor feed current and the initial discharge effective value of the feed battery; and during discharging of the feed battery, adjusting a discharge current of the feed battery based on the discharge adjustment value. In the embodiments of this application, the discharge amount of the feed battery can be adjusted, thus equalizing current of the traction battery and the feed battery.

In some embodiments, after the controlling a traction battery and a feed battery of the battery module to charge and discharge each other, the method further includes: when temperature of the battery module meets a temperature requirement, controlling the traction battery and the feed battery of the battery module to stop charging and discharging. In the embodiments of this application, after the temperature of the battery module meets the temperature requirement, the traction battery and the feed battery of the battery module are controlled to stop charging and discharging, so that potential safety hazards due to continuous rise of temperature of the battery module are avoided.

In some embodiments, after the controlling the traction battery and the feed battery of the battery module to stop charging and discharging, the method further includes: when a voltage difference between the traction battery and the feed battery is not in a preset threshold range, controlling one of the traction battery and the feed battery with a higher voltage to discharge to the other one of the traction battery and the feed battery with a lower voltage; when determination is made in real time in the discharge process that the voltage difference between the traction battery and the feed battery is not in the preset threshold range, continuing the discharge process; and when determination is made in real time in the discharge process that the voltage difference between the traction battery and the feed battery is in the preset threshold range, stopping the discharge process. In the embodiments of this application, after the mutual charging and discharging is ended, a voltage difference between the batteries is further determined, and the voltage difference between the traction battery and the feed battery is kept in the preset threshold range by virtue of discharging, thereby equalizing voltage of the traction battery and the feed battery and guaranteeing that the traction battery and the feed battery are not damaged after being connected in parallel.

In some embodiments, after the stopping the discharge process, the method further includes: when the motor of the vehicle requests to start, controlling the traction battery and the feed battery to be connected in parallel to power the motor of the vehicle.

In some embodiments, the battery parameter includes battery temperature, and the preset heating condition includes that the battery temperature of the battery module is lower than a preset temperature.

In some embodiments, the battery parameter includes battery temperature and battery level, and the preset heating condition includes that the battery temperature of the battery module is lower than a preset temperature and the battery level is higher than a preset battery level. In the embodiments of this application, the battery module is heated only when the temperature is lower than the preset temperature and the battery level is higher than the preset battery level, thereby ensuring that there is enough electric energy to maintain self-heating of the batteries.

In some embodiments, before the controlling a traction battery and a feed battery of the battery module to charge and discharge each other, the method further includes: controlling the traction battery and the feed battery of the battery module to be connected in series reversely, where the traction battery and the feed battery of the battery module are connected in parallel under a non-heating condition to power the motor. In the embodiments of this application, in self-heating of the battery module, the traction battery and the feed battery are controlled to be connected in series reversely, so that the traction battery and the feed battery form a self-heating circuit topology which allows effective self-heating.

In a second aspect, this application provides a battery heating control apparatus, including: a collection module, configured to collect a battery parameter of a battery module; and a control module, configured to: when the battery parameter of the battery module meets a preset heating condition, control a traction battery and a feed battery of the battery module to charge and discharge each other so that the battery module is heated through mutual charge and discharge of the traction battery and the feed battery; and control the traction battery of the battery module to power a motor of a vehicle so that the vehicle runs.

In the technical solution of the embodiments of this application, when the battery parameter of the battery module meets the preset heating condition, the traction battery and the feed battery of the battery module are controlled to charge and discharge each other. As the traction battery and the feed battery both have internal resistance, the mutual charge and discharge of the traction battery and the feed battery causes their internal resistance to produce thermal energy so as to heat the battery module. In the technical solution, when the batteries are being heated, the traction battery powers the motor of the vehicle so that the vehicle runs. That is, the technical solution provides a scheme and effects of battery self-heating during vehicle driving, resolving the present problem of poor convenience of vehicle use in low temperature environments due to the need to heat batteries in advance. Particularly, the safety of vehicle use in low temperature environments is guaranteed while the convenience of vehicle use is also improved.

In some embodiments, the control module is specifically configured to: control one of the traction battery and the feed battery of the battery module to discharge to an energy storage element so as to charge the energy storage element; and control the energy storage element to charge the other one of the traction battery and the feed battery. According to the embodiments of this application, the energy storage element serves as an intermediate element in the charge and discharge process to implement the mutual charge and discharge of the traction battery and the feed battery, so that self-heating of the battery module can be realized based on existing components and a simple and easy to use technical solution.

In some embodiments, the control module is further specifically configured to: obtain a discharge effective value of the traction battery and a discharge effective value of the feed battery; calculate a traction discharge duration corresponding to the traction battery and a feed discharge duration corresponding to the feed battery based on the discharge effective value of the traction battery and the discharge effective value of the feed battery; during discharging of the traction battery, control the traction battery to release electric energy for the traction discharge duration; and during discharging of the feed battery, control the feed battery to release electric energy for the feed discharge duration. In the embodiments of this application, the discharge duration of the traction battery and that of the feed battery are controlled, thus equalizing current of the traction battery and the feed battery.

In some embodiments, the control module is further specifically configured to: obtain a motor feed current and an initial discharge effective value of the feed battery; calculate a discharge adjustment value for the feed battery based on the motor feed current and the initial discharge effective value of the feed battery; and during discharging of the feed battery, adjust a discharge current of the feed battery based on the discharge adjustment value. In the embodiments of this application, the discharge amount of the feed battery can be adjusted, thus equalizing current of the traction battery and the feed battery.

In some embodiments, the control module is further specifically configured to: when temperature of the battery module meets a temperature requirement, control the traction battery and the feed battery of the battery module to stop charging and discharging.

In some embodiments, the control module is further configured to: when a voltage difference between the traction battery and the feed battery is not in a preset threshold range, control one of the traction battery and the feed battery with a higher voltage to discharge to the other one of the traction battery and the feed battery with a lower voltage; and the control module is further configured to: when determination is made in real time in the discharge process that the voltage difference between the traction battery and the feed battery is not in the preset threshold range, continue controlling the discharge process; and when determination is made in real time that the voltage difference between the traction battery and the feed battery is in the preset threshold range, stop the discharge process.

In some embodiments, the control module is further configured to control the traction battery and the feed battery of the battery module to be connected in series reversely, where the traction battery and the feed battery of the battery module are connected in parallel under a non-heating condition to power the motor.

In a third aspect, this application provides an electronic device including a memory and a processor, the memory storing a computer program, where the method in any alternative implementation of the first aspect or the second aspect is implemented when the processor executes the computer program.

In a fourth aspect, this application provides a computer readable storage medium having a computer program stored therein, where the method in any alternative implementation of the first aspect or the second aspect is implemented when the computer program is executed by a processor.

In a fifth aspect, this application provides a computer program product. When run on a computer, the computer program product enables the computer to execute the method in any alternative implementation of the first aspect or the second aspect.

The foregoing description is merely a summary of the technical solutions in the embodiments of this application. In order to make clearer the technical means in the embodiments of this application for implementation according to content disclosed in the specification, and to make the above and other objectives, features and advantages of the embodiments of this application more obvious and easier to understand, the following describes specific embodiments of this application.

BRIEF DESCRIPTION OF DRAWINGS

By reading detailed description of the embodiments below, various other advantages and benefits will be clear to persons of ordinary skill in the art. The accompanying drawings are merely used for illustrating the embodiments and should not be construed as limitation on this application. Throughout the drawings, same reference signs refer to same components. In the accompanying drawings.

Figure 1:
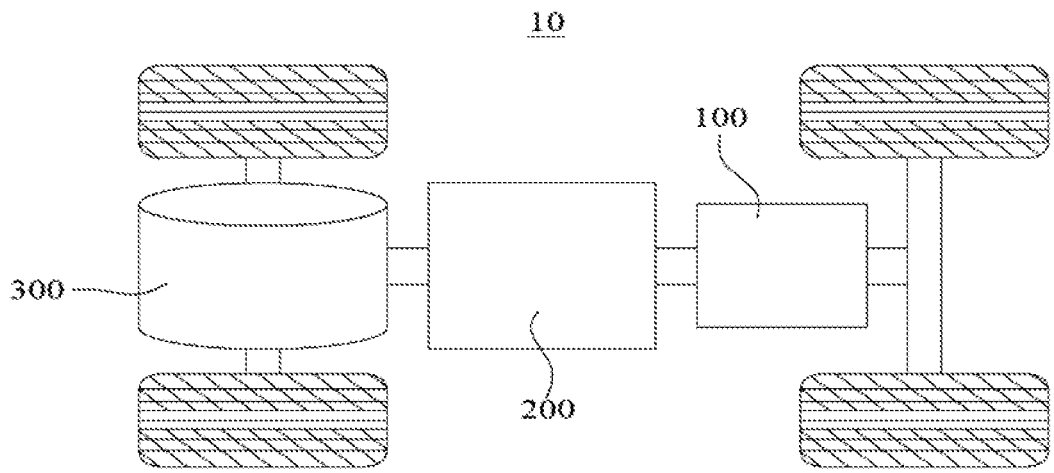
FIG. 1 is a schematic structural diagram of a vehicle of some embodiments of this application.

Reference signs in the accompanying drawings in the specific embodiments are as follows:

10: vehicle; 100: battery; 200: controller; 300: motor; Bat1: feed battery; Bat2: traction battery; M: motor; M1: first motor; M2: second motor; 1100: collection module; 1110: determination module; 1120: control module; 12: electronic device; 1201: processor; 1202: memory; and 1203: communication bus.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", "have" and any other variations thereof in the specification, the claims and the foregoing brief description of drawings of this application are intended to cover a non-exclusive inclusion.

In descriptions of the embodiments of this application, the terms "first" and "second" and the like are merely intended to distinguish between different objects, and shall not be understood as any indication or implication of relative importance or implicit indication of the quantities, specific sequence or dominant-subordinate relationship of indicated technical features. In the descriptions of the embodiments of this application, "a plurality of" means at least two unless otherwise specifically stated.

The term "embodiment" described herein means that specific features, structures or characteristics described with reference to the embodiment may be incorporated in at least one embodiment of this application. The word "embodiment" appearing in various places in the specification does not necessarily refer to a same embodiment, or an independent or alternative embodiment that is exclusive of other embodiments. Persons skilled in the art explicitly and implicitly understand that the embodiments described herein may combine with other embodiments.

In the descriptions of the embodiments of this application, the term "and/or" describes only an association relationship for describing associated objects and represents that three relationships may exist. For example, A and/or B may represent the following three cases: A alone, both A and B, and B alone. In addition, the character "/" in this specification generally indicates an "or" relationship between contextually associated objects.

In the descriptions of the embodiments of this application, the term "a plurality of" means two or more than two. Similarly, "a plurality of groups" means two or more than two groups, and "a plurality of pieces" means two or more than two pieces.

In the descriptions of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings. They are merely intended for ease of description of the embodiments of this application and simplification of the description, rather than to indicate or imply that the apparatuses or components mentioned must have the specified orientations or must be constructed and operated in the specified orientations, and therefore shall not be construed as limitations on the embodiments of this application.

In the descriptions of the embodiments of this application, unless otherwise specified and defined explicitly, the technical terms "mount", "connect", "join", and "fix" should be understood in their general senses. For example, they may refer to a fixed connection, a detachable connection, or an integral union; or refer to a mechanical connection or an electrical connection; or refer to a direct connection or an indirect connection through an intermediate medium; or refer to internal communication between two components or interaction between two components. Persons of ordinary skill in the art can understand specific meanings of these terms in the embodiments of this application as appropriate to specific situations.

At present, the development of market situation shows that batteries are used increasingly wide. Batteries are applied to both energy storage power systems such as hydroelectric, thermal, wind and solar power plants and electric transport tools such as electric bicycles, electric motors and electric vehicles, as well as many other fields such as military equipment and aerospace. With the increasing expansion of the application fields of traction batteries, their market demands are also constantly increasing.

It is noted by the inventor that all electric vehicles in the market require advance self-heating of vehicle batteries in low temperature environments, and they cannot start driving before self-heating of the batteries has been completed, which brings great inconvenience to users of vehicles. Particularly, for emergent vehicle use without batteries heated in advance, the problem of inconvenience is prominent at present.

In order to resolve the above problem, the applicant has found through research that the reason why at present vehicles have to run after heating has been completed is that the present feed circuit topology of the vehicle motor and its corresponding feed control policy do not support vehicle driving during heating of batteries. On this basis, after intensive studies, the applicant believes that self-heating of batteries can be realized during driving of the vehicle by virtue of designing a reasonable feed circuit topology and a reasonable control policy fitting the topology.

The inventor, through intensive studies, has designed a battery module which is provided with a feed battery and a traction battery. When self-heating of batteries is not needed, the feed battery and the traction battery are connected in parallel to power the motor of the vehicle so as to provide traction to the vehicle; when self-heating of batteries is needed, the feed battery and the traction battery are connected in series reversely to charge and discharge each other through an intermediate energy storage element so as to realize self-heating of the battery module. The traction battery powers the motor of the vehicle and provides traction to the vehicle as well. In this way, self-heating of batteries is implemented during driving of the vehicle.

The battery self-heating control method disclosed by the embodiments of this application may be applied to motive devices using batteries as a power source. Such motive devices include but are not limited to electric apparatuses such as vehicles, ships or aircrafts.

For ease of description, the following embodiments are described by using an example where the electric apparatus is a vehicle 10 as in an embodiment of this application.

Referring to FIG. 1, FIG. 1 is a schematic structural diagram of a vehicle 10 provided by some embodiments of this application. The vehicle 10 may be an oil-fueled vehicle, a gas-powered vehicle, or a new energy vehicle. The new energy vehicle may be a battery electric vehicle, a hybrid electric vehicle, an extended-range electric vehicle, or the like. The vehicle 10 is internally provided with a battery 100, and the battery 100 may be arranged at the bottom or head or tail of the vehicle 10. The battery 100 may be configured to supply power to the vehicle 10. For example, the battery 100 may be used as an operational power supply for the vehicle 10. The vehicle 10 may further include a controller 200 and a motor 300, and the controller 200 is configured to control the battery 100 to supply power to the motor 300, for example, to supply operational power required during start, navigation, and driving of the vehicle 10.

In some embodiments of this application, the battery 100 can be used as not only the operational power supply for the vehicle 10 but also a driving power supply for the vehicle 10, replacing all or part of fossil fuel or natural gas to provide driving power for the vehicle 10.

It is to be noted herein that the battery 100 in this application serves as a driving power supply of the vehicle 10 to supply driving power for the vehicle 10.

Figure 2:
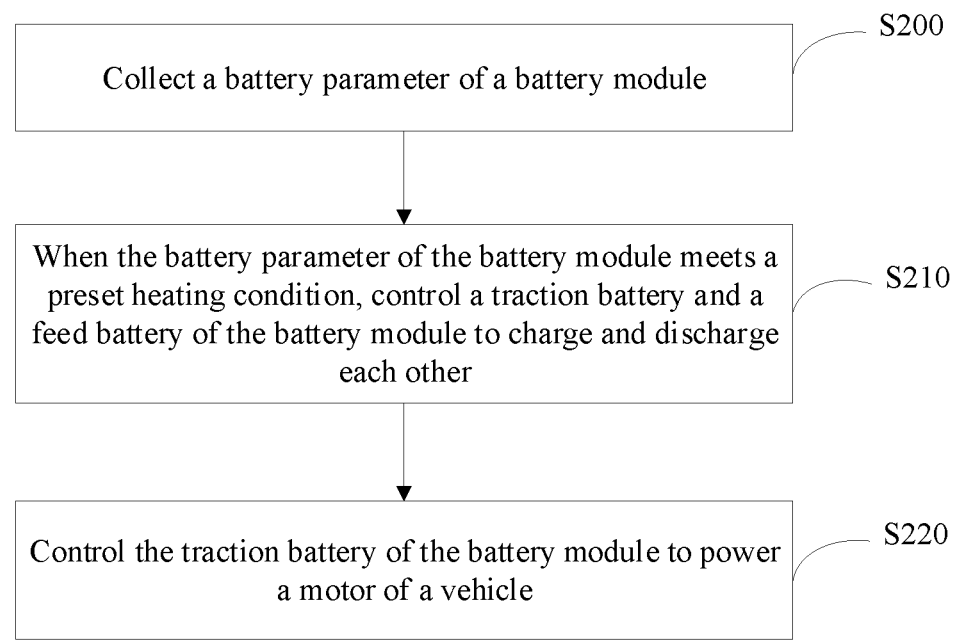
FIG. 2 is a first flowchart of a battery heating control method of some embodiments of this application.

According to some embodiments of this application, a battery heating control method of an embodiment of this application may be applied to controllers of vehicles. The battery heating control method can realize battery self-heating during vehicle driving. As shown in FIG. 2, the battery heating control method includes the following steps:

S200: Collect a battery parameter of a battery module.

S210: When the battery parameter of the battery module meets a preset heating condition, control a traction battery and a feed battery of the battery module to charge and discharge each other.

S220: Control the traction battery of the battery module to power a motor of a vehicle.

According to this solution, in S200, the battery parameter of the battery module may be collected through a battery management system (BMS), and the battery parameter of the battery module may include battery temperature of the battery module, power level of the battery module, voltage of the battery module, and the like.

On this basis, S210 is executed according to the solution: when the battery parameter of the battery module meets a preset heating condition, a traction battery and a feed battery of the battery module are controlled to charge and discharge each other. The preset heating condition indicates that the battery parameter of the battery module meets a condition where self-heating of the battery module is required. The battery module includes the traction battery and the feed battery, and the traction battery and the feed battery charge and discharge each other under the condition that the battery module is to be heated, so that their internal resistance produces thermal energy to heat the battery module.

According to the solution, in S220, the traction battery of the battery module is controlled to power the motor of the vehicle, so that the traction battery not only charges and discharges the feed battery to realize self-heating, but also powers the motor of the vehicle so that the vehicle can run during self-heating of the batteries. It is to be noted herein that the step S210 of controlling a traction battery and a feed battery of the battery module to charge and discharge each other and S220 may be executed successively or simultaneously regardless of order, and the executing order of the two is not defined in this application.

Figure 3:
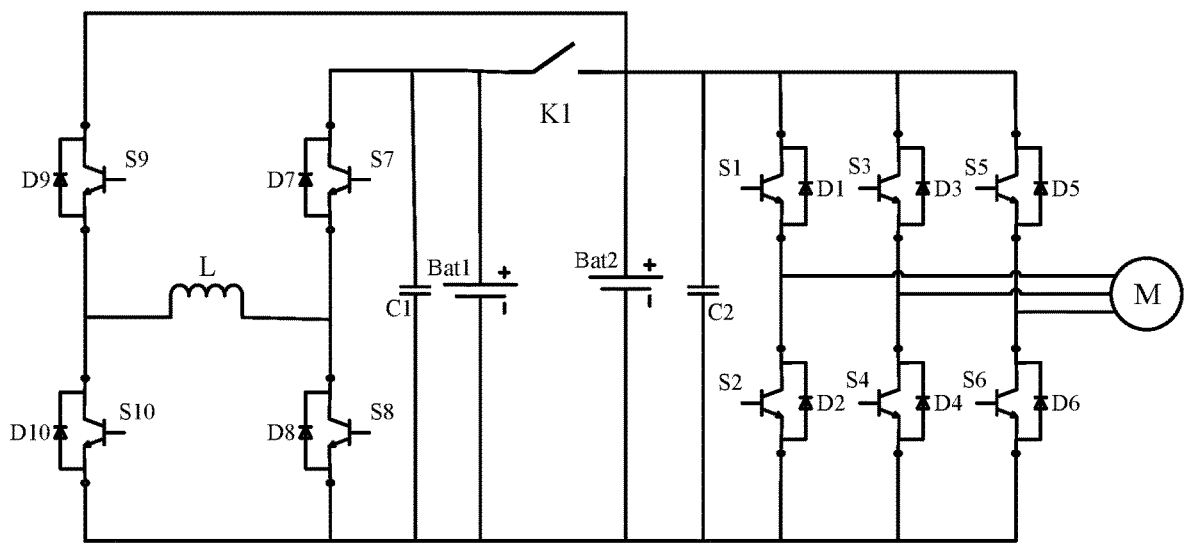
FIG. 3 illustrates a single-motor power circuit topology provided by some embodiments of this application.

As a possible example, FIG. 3 illustrates a single-motor power circuit topology to which the battery heating control method provided by this application can be applied. Referring to FIG. 3, Bat1 is a feed battery, Bat2 is a traction battery, and a switch K1 is turned off when the battery module is not being heated. With K1 off, the feed battery Bat1 and the traction battery Bat2 are connected in parallel to power a motor M. Specifically, in FIG. 3, when K1 is off, the feed battery Bat1 and the traction battery Bat2 power the motor of the vehicle through controllable tube switches S1, S2, S3, S4, S5 and S6. A current path is as follows: positive electrodes of the feed battery Bat1 and the traction battery Bat2→switches S1, S3 and S5→motor M→switches S2, S4 and S6→negative electrodes of the feed battery Bat1 and the traction battery Bat2.

After the battery parameter of the battery module meets the preset heating condition, the battery heating control method provided by this application may control the switch K1 to be turned off. With K1 off, the feed battery Bat1 and the traction battery Bat2 are connected in series reversely, so that the feed battery Bat1 and the traction battery Bat2 charge and discharge each other through a reverse series topology so as to produce thermal energy in the charge and discharge process of the feed battery Bat1 and the traction battery Bat2, so that the battery module is heated. In addition, with K1 off, the feed battery Bat1 no longer provides electric energy to the motor M but the traction battery Bat2 provides electric energy to the motor M, so that the vehicle can run during self-heating of the batteries.

According to the battery heating control method as designed above, in the technical solution, when the battery parameter of the battery module meets the preset heating condition, the traction battery and the feed battery of the battery module are controlled to charge and discharge each other. As the traction battery and the feed battery both have internal resistance, the mutual charge and discharge of the traction battery and the feed battery causes their internal resistance to produce thermal energy so as to heat the battery module. In addition, with this solution, the traction battery is used to power the motor of the vehicle during battery heating so that the vehicle runs. That is, the technical solution provides a scheme of battery self-heating during vehicle driving, resolving the present problem of poor convenience of vehicle use in low temperature environments due to the need to heat batteries in advance. The safety of vehicle use in low temperature environments is guaranteed while the convenience of vehicle use is also improved.

Figure 4:
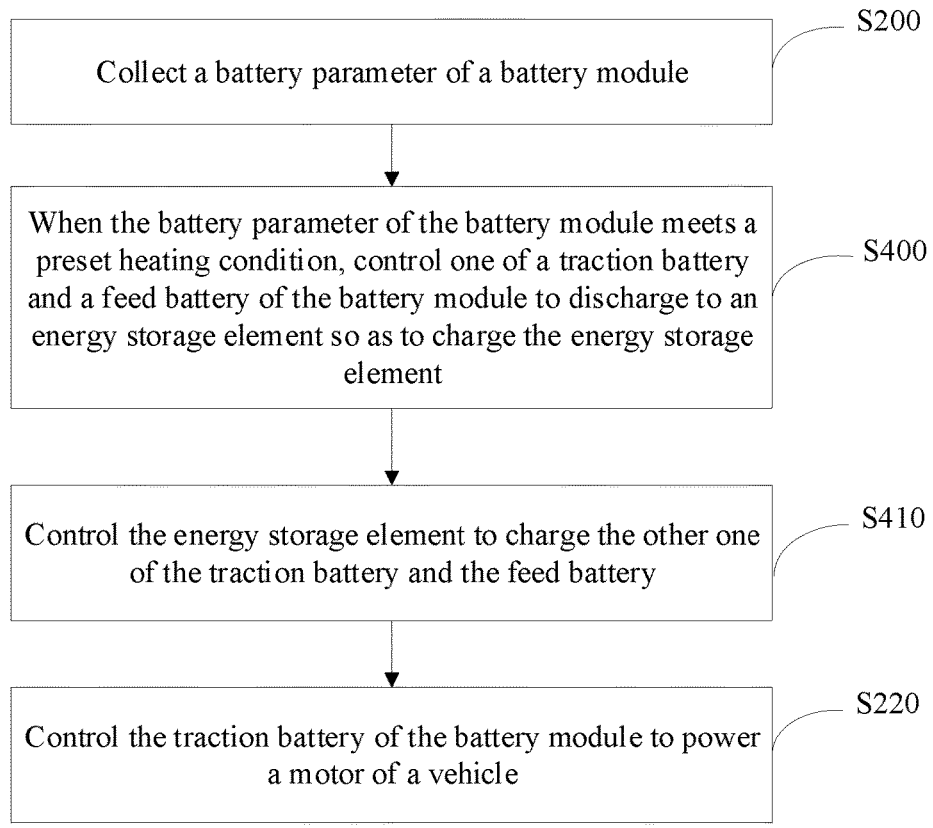
FIG. 4 is a second flowchart of a battery heating control method of some embodiments of this application.

According to some embodiments of this application, as shown in FIG. 4, the controlling a traction battery and a feed battery of the battery module to charge and discharge each other in S210 may be implemented in the following way, including:

S400: Control one of the traction battery and the feed battery of the battery module to discharge to an energy storage element so as to charge the energy storage element; and S410: Control the energy storage element to discharge the other one of the traction battery and the feed battery.

In the above embodiment, the energy storage element serves as an intermediate element to implement the mutual charge and discharge of the traction battery and the feed battery. The energy storage element includes, but is not limited to, components such as inductors and capacitors.

In addition, in the above embodiment, the technical solution does not define which battery is the first to charge or discharge. To be specific, the technical solution does not define which one of the traction battery and the feed battery is to discharge to the energy storage element in an initial state. On this basis, the technical solution includes the following many cases: as a possible implementation, in the initial state, the traction battery discharges to the energy storage element first so as to charge the energy storage element, and then the energy storage element discharges to the feed battery so as to charge the feed battery. As another possible implementation, in the initial state, the feed battery may discharge to the energy storage element first so as to charge the energy storage element, and then the energy storage element discharges to the traction battery so as to charge the traction battery.

Reference is still made to FIG. 3 by taking the traction battery being the first to discharge in the initial state as an example. With K1 off, in the technical solution, a switch S9 and a switch S8 may be controlled to be turned on, and a switch S10 and a switch S7 may be controlled to be turned off, so that the traction battery Bat2 charges an inductor L. In this case, a current path is as follows: positive electrode of the traction battery Bat2→switch S9→inductor L→switch S8→negative electrode of the traction battery Bat2.

Then the switch S8 is turned off and the switch S7 is turned on so as to control the inductor L to charge the feed battery Bat1. In this case, a current path is as follows: positive electrode of the traction battery Bat2→switch S9→inductor L→switch S7→negative electrode of the feed battery Bat1→negative electrode of the traction battery Bat2.

According to the embodiments of this application, the energy storage element serves as an intermediate element in the charge and discharge process to implement the mutual charge and discharge of the traction battery and the feed battery, so as to realize self-heating of the battery module based on simple components.

According to some embodiments of this application, alternatively, the controlling the energy storage element to charge the other one of the traction battery and the feed battery in S410 may include the following many cases: as a possible implementation, in the technical solution, after charging of the energy storage element has been completed, the energy storage element may be controlled to charge the other one of the traction battery and the feed battery.

As another possible implementation, in the technical solution, the energy storage element may be controlled to charge the other one of the traction battery and the feed battery during charging of the energy storage element.

In the above embodiments, according to foregoing examples, in the technical solution, the inductor L may be controlled to charge the other one of the traction battery and the feed battery after charging of the inductor L has been completed. For example, the switch S8 is controlled to be turned off and the switch S7 is controlled to be turned on only after charging of the inductor L by the traction battery Bat2 has been completed, so that the inductor L charges the feed battery.

As another possible implementation, in the technical solution, the inductor L may be controlled to charge the other one of the traction battery and the feed battery during charging of the inductor L. For example, during charging of the inductor L by the traction battery Bat2, that is, when charging of the inductor L has not yet been completed, the switch S8 may be controlled to be turned off and the switch S7 may be controlled to be turned on, so that the inductor L charges the feed battery.

In the embodiments of this application, the energy storage element is controlled to charge the battery after charging of the energy storage element has been completed or during charging of the energy storage element, so as to control the mutual charging and discharging of the traction battery and the feed battery by using various control methods.

Figure 5:
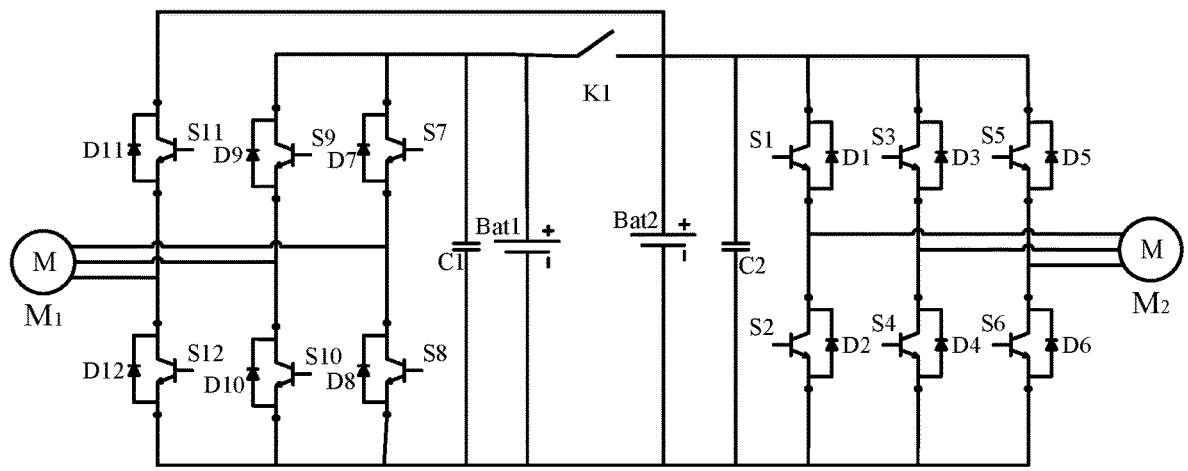
FIG. 5 illustrates a dual-motor power circuit topology provided by some embodiments of this application.

According to some embodiments of this application, alternatively, the technical solution is not only applicable for scenarios where the vehicle is driven by a single motor, but also applicable for scenarios where the vehicle is driven by dual motors. Referring to FIG. 5, FIG. 5 illustrates another topology which includes a dual-motor power circuit to which the battery heating control method provided by this application can be applied. This circuit topology includes a first motor M1 and a second motor M2. Without heating where K1 is off, the feed battery Bat1 and the traction battery Bat2 are connected in parallel to power the first motor M1 and the second motor M2.

In the case of heating, in the technical solution, K1 is controlled to be turned off. In this case, the traction battery Bat2 powers the second motor M2 and the traction battery Bat2 and the feed battery Bat1 are connected in series reversely, where the energy storage element is a stator inductor in the first motor M1, so that the traction battery Bat2 and the feed battery Bat1 charge and discharge each other via the stator inductor in the first motor M1 as an intermediate component.

The charge and discharge process of the traction battery Bat2 and the feed battery Bat1 with the stator inductor in the first motor M1 serving as the energy storage element is consistent with the above charge and discharge process with the inductor L serving as the energy storage element, which is not repeated herein.

According to the embodiments of this application, where the vehicle has dual motors, the stator inductor of one of the motors serves as an energy storage element and the other one of the motors provides traction to the vehicle. The use of an existing stator inductor of a motor as an energy storage element saves the provision of a separate energy storage element while assuring the scheme of battery self-heating during driving, lowering the costs of circuitry design and saving the cost of an energy storage element.

Figure 6:
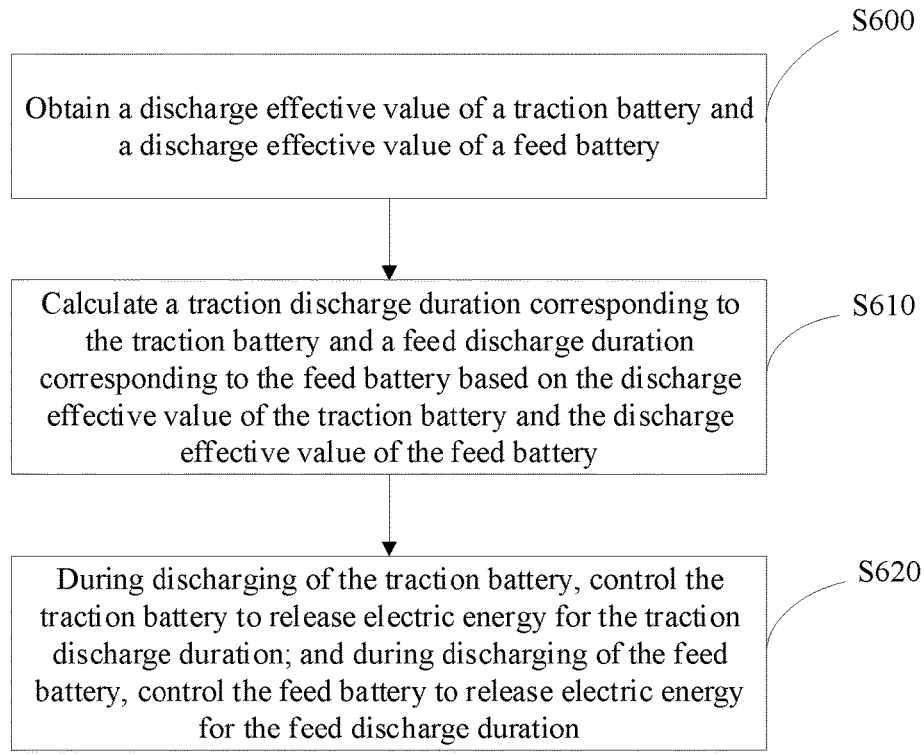
FIG. 6 is a third flowchart of a battery heating control method of some embodiments of this application.

According to some embodiments of this application, alternatively, the controlling a traction battery and a feed battery of the battery module to charge and discharge each other in S210, as shown in FIG. 6, may specifically include the following steps:

S600: Obtain a discharge effective value of the traction battery and a discharge effective value of the feed battery.

S610: Calculate a traction discharge duration corresponding to the traction battery and a feed discharge duration corresponding to the feed battery based on the discharge effective value of the traction battery and the discharge effective value of the feed battery.

S620: During discharging of the traction battery, control the traction battery to release electric energy for the traction discharge duration; and during discharging of the feed battery, control the feed battery to release electric energy for the feed discharge duration.

In S600, the discharge effective value is a current root mean square value in the discharge process. It can be known, by referring to FIG. 3, that the traction battery Bat2 not only charges and discharges the feed battery Bat1 to produce thermal power but also provides traction to the motor M, so that the traction battery Bat2 has greater energy loss and a higher heating rate than the feed battery Bat1. Therefore, it is necessary to control the discharge difference between the feed battery Bat1 and the traction battery Bat2, so as to guarantee an equal root mean square value for the feed battery Bat1 and the traction battery Bat2 during self-heating in combination with work of the motors, thereby guaranteeing that their heating rates are equal.

Therefore, in the above embodiment, in the technical solution, the respective discharge durations of the traction battery and the feed battery are calculated based on the discharge effective values of the traction battery and the feed battery, so as to control that the energy discharged by the feed battery Bat1 to the traction battery Bat2 is more than the energy that is returned to charge feed battery Bat1, so as to compensate for the energy loss of the traction battery Bat2, thereby equalizing current of the feed battery Bat1 and the traction battery Bat2 and guaranteeing balanced states of charge (SOC) of the traction battery and the feed battery.

As a possible implementation, in the technical solution, a discharge duty cycle of the feed battery may be calculated based on the discharge effective values of the traction battery and the feed battery, so as to control the discharge time of the feed battery. Specifically, the discharge duty cycle of the feed battery Bat1 is $D=I_{rms2}/(I_{rms1}+I_{rms2})$, where $I_{rms1}$ is the discharge effective value of the feed battery and $I_{rms2}$ is the discharge effective value of the traction battery. As the discharge effective value of the traction battery is larger, the discharge duty cycle of the feed battery Bat1 is larger. Specifically, this causes the off time of the switches in FIG. 3 during discharging of the feed battery Bat1 to be longer, and therefore, the discharge time of the feed battery Bat1 is prolonged. As a result, the energy discharged by the feed battery Bat1 to the traction battery Bat2 is more than the energy that is returned to charge the feed battery Bat1, so as to compensate for the energy loss of the traction battery Bat2, thereby equalizing current of the feed battery Bat1 and the traction battery Bat2 and guaranteeing balanced SOCs of the feed battery and the traction battery.

According to the embodiments of this application, the discharge durations of the traction battery and the feed battery are controlled, so that the energy discharged by the feed battery to the traction battery is more than the energy returned to charge the feed battery, so as to compensate for the energy loss of the traction battery, thereby equalizing current of the feed battery and the traction battery and guaranteeing balanced SOCs of the traction battery and the feed battery, which in turn satisfies the requirements of different working conditions during vehicle driving and heating.

Figure 7:
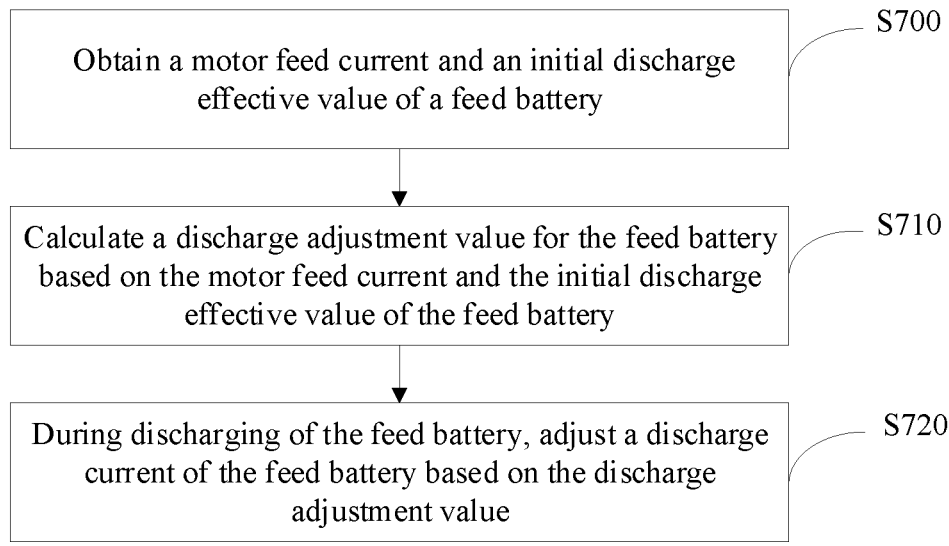
FIG. 7 is a fourth flowchart of a battery heating control method of some embodiments of this application.

According to some embodiments of this application, besides the above method of prolonging the discharge duration of the feed battery, for the controlling a traction battery and a feed battery of the battery module to charge and discharge each other in S210, as shown in FIG. 7, in the technical solution, current of the feed battery and the traction battery may be equalized through the following steps:

S700: Obtain a motor feed current and an initial discharge effective value of the feed battery.

S710: Calculate a discharge adjustment value for the feed battery based on the motor feed current and the initial discharge effective value of the feed battery.

S720: During discharging of the feed battery, adjust a discharge current of the feed battery based on the discharge adjustment value.

In S700, the motor feed current is a motor requested current, and the motor requested current may be calculated based on a motor speed corresponding to position of an accelerator pedal during vehicle driving. The initial discharge effective value of the feed battery is a discharge effective value of the feed battery in the initial state.

After the motor feed current and the initial discharge effective value of the feed battery are obtained, in the technical solution, the discharge adjustment value for the feed battery is calculated based on the motor feed current and the initial discharge effective value of the feed battery. Specifically, a sum of the motor feed current and the initial discharge effective value of the feed battery may be calculated to obtain the discharge adjustment value, so as to increase the discharge current of the feed battery to compensate for energy of the traction battery discharged to the motor, thereby equalizing current of the feed battery and the traction battery and guaranteeing balanced SOCs of the traction battery and the feed battery.

Specifically, on the basis that an inductor serves as an intermediate element to implement mutual charge and discharge the traction battery and the feed battery, in the technical solution, the time in which the feed battery charges the inductor may be prolonged, so that the discharge current of the inductor is increased, thereby increasing the discharge current during discharging of the feed battery to the traction battery.

In the embodiments of this application, the discharge amount of the feed battery is adjusted so as to compensate for the energy of the traction battery discharged to the motor, thereby equalizing current of the feed battery and the traction battery and guaranteeing balanced SOCs of the traction battery and the feed battery.

Figure 8:
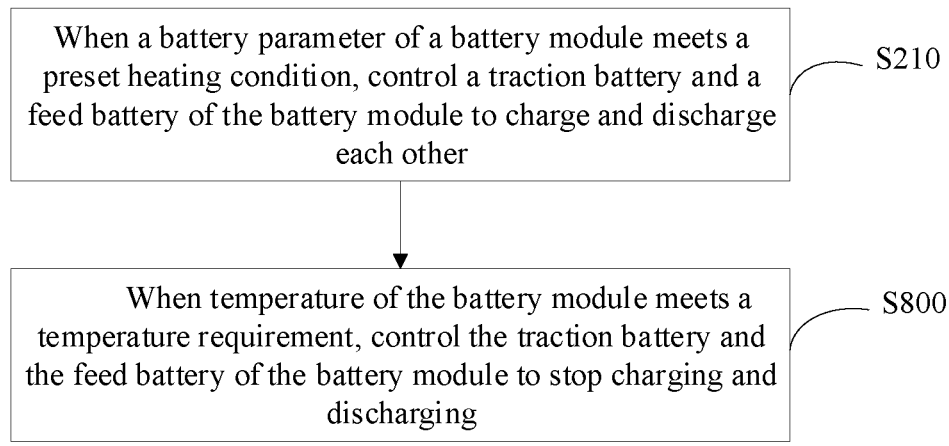
FIG. 8 is a fifth flowchart of a battery heating control method of some embodiments of this application.

According to some embodiments of this application, optionally, after the controlling a traction battery and a feed battery of the battery module to charge and discharge each other in S210, as shown in FIG. 8, the technical solution may further include the following step:

S800: When temperature of the battery module meets a temperature requirement, control the traction battery and the feed battery of the battery module to stop charging and discharging.

In the technical solution of this embodiment, after the traction battery and the feed battery charge and discharge each other to heat the battery module, whether the temperature of the battery module meets the temperature requirement is determined. With the temperature requirement met, the traction battery and the feed battery of the battery module may be controlled to stop charging and discharging each other, thereby stopping heating the battery module. The temperature requirement may be set according to specific use conditions of the batteries.

In this embodiment, after the temperature of the battery module meets the temperature requirement, the traction battery and the feed battery of the battery module are controlled to stop charging and discharging, so that potential safety hazards due to continuous rise of temperature of the battery module are avoided.

Figure 9:
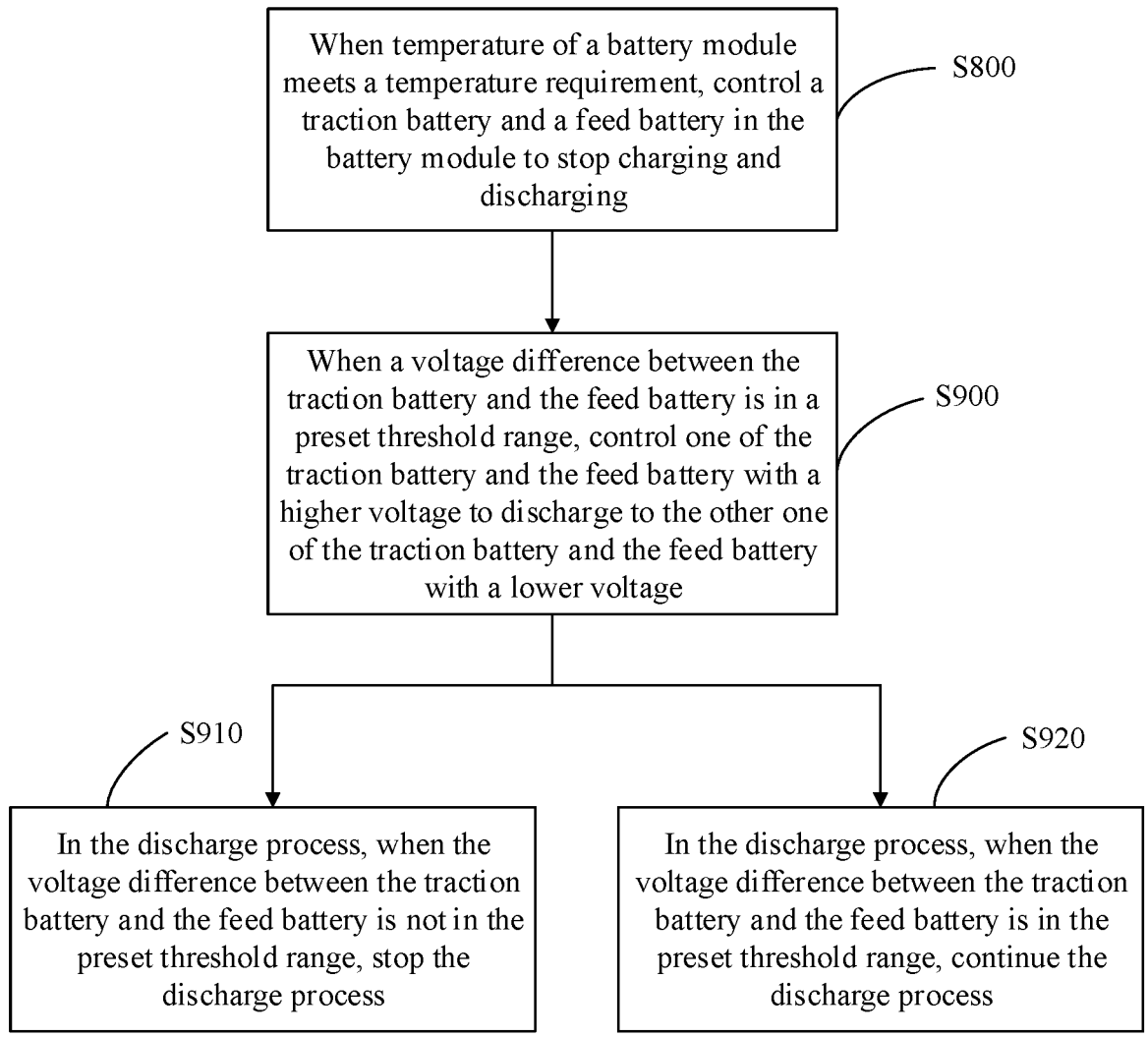
FIG. 9 is a sixth flowchart of a battery heating control method of some embodiments of this application.

According to some embodiments of this application, optionally, after heating of the battery module is stopped, in the technical solution, a voltage difference between the feed battery and the traction battery may further be determined, so as to prevent the batteries from being damaged due to too large voltage difference after the feed battery and the traction battery are connected in parallel. As shown in FIG. 9, this may include the following steps:

S900: When a voltage difference between the traction battery and the feed battery is in a preset threshold range, control one of the traction battery and the feed battery with a higher voltage to discharge to the other one of the traction battery and the feed battery with a lower voltage.

S910: In the discharge process, when the voltage difference between the traction battery and the feed battery is not in the preset threshold range, stop the discharge process.

S920: In the discharge process, when the voltage difference between the traction battery and the feed battery is in the preset threshold range, continue the discharge process.

In S900, there may be a number of ways of determining whether the voltage difference between the traction battery and the feed battery is in the preset threshold range. In a possible implementation of the solution, the voltages of the traction battery and the feed battery may be obtained and the difference between the voltage of the traction battery and the voltage of the feed battery is calculated to obtain the voltage difference between the traction battery and the feed battery, and then whether the voltage difference is in the preset threshold range is determined.

As another possible implementation, the voltage difference may be evaluated by using a parameter that indirectly reflects the voltage difference. For example, an SOC difference between ternary lithium batteries can reflect their voltage difference accurately. Therefore, alternatively, on a basis that the traction battery and the feed battery are both ternary lithium batteries, SOCs of the traction battery and the feed battery may be obtained, and then whether the SOC difference of the traction battery and the feed battery is in the preset threshold is determined.

If determination is made that the voltage difference between the traction battery and the feed battery is in the preset threshold range, it indicates that the voltage difference between the traction battery and the feed battery meets the requirement, and the batteries connected in parallel will not be damaged, so that it is unnecessary to execute the subsequent discharge operation.

If determination is made that the voltage difference between the traction battery and the feed battery is not in the preset threshold range, it indicates that the voltage difference between the traction battery and the feed battery does not meet the requirement, and on this basis, one of the traction battery and the feed battery with a higher voltage is controlled to discharge to the other one of the traction battery and the feed battery with a lower voltage. It is assumed that the voltage of the feed battery is higher than that of the traction battery. Then, the feed battery is controlled to discharge to the energy storage element, so that the energy storage element can charge the traction battery.

In the above discharge process, in the technical solution, whether the voltage difference between the feed battery and the traction battery is in the preset threshold range is determined in real time. If it is in the preset threshold range, it indicates that the voltage difference between the traction battery and the feed battery meets the requirement, and the above discharge process is stopped immediately. If it is not in the preset threshold range, the above discharge process is continued without any intervention.

In the embodiments of this application, after the mutual charging and discharging is ended, a voltage difference between the batteries is further determined, and the voltage difference between the traction battery and the feed battery is kept in the preset threshold range by virtue of discharging, thereby equalizing voltage of the traction battery and the feed battery and guaranteeing that the traction battery and the feed battery are not damaged after being connected in parallel.

Figure 10:
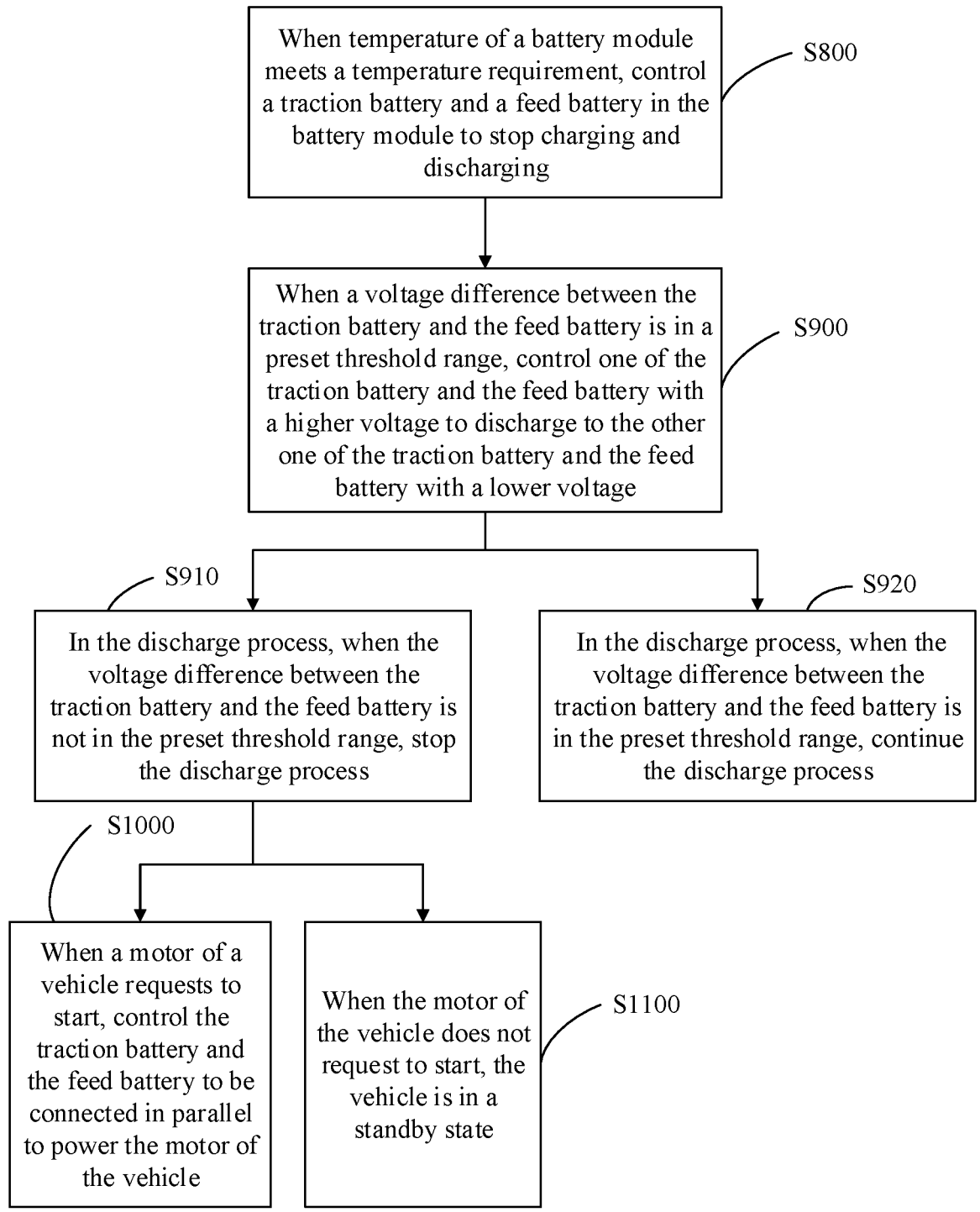
FIG. 10 is a seventh flowchart of a battery heating control method of some embodiments of this application.

According to some embodiments of this application, optionally, as shown in FIG. 10, after S910 is executed to stop the discharge process, the technical solution may further include the following steps:

S1000: When the motor of the vehicle requests to start, control the traction battery and the feed battery to be connected in parallel to power the motor of the vehicle.

S1100: When the motor of the vehicle does not request to start, the vehicle is in a standby state.

In the above steps, after voltages of the traction battery and the feed battery are equalized, whether the motor of the vehicle requests to start may be determined. If the motor requests to start, the traction battery and the feed battery are controlled to be connected in parallel to power the motor of the vehicle. If the motor does not request to start, the vehicle is in the standby state.

If the motor requests to start, still referring to FIG. 3, the switch K1 may be controlled to be turned off, so as to control the traction battery Bat2 and the feed battery Bat1 to be connected in parallel to power the motor M of the vehicle, so that the vehicle runs without heating.

As a possible implementation, the preset heating condition may be that battery temperature of the battery module is lower than a preset temperature. Therefore, in S210, the battery temperature of the battery module being lower than the preset temperature indicates that the battery parameter of the battery module meets the preset heating condition.

As another possible implementation, since the battery module consumes power of the battery module during self-heating, on this basis, besides including a condition that the battery temperature of the battery module is lower than the preset temperature, the designed preset heating condition further includes a condition that a battery level is higher than a preset battery level. Therefore, in S210, the battery temperature being lower than the preset temperature and the battery level being higher than the preset battery level indicates that the battery parameter of the battery module meets the preset heating condition.

In the embodiments of this application, the battery module is heated only when the temperature is lower than the preset temperature and the battery level is higher than the preset battery level, thereby ensuring that there is enough electric energy to maintain self-heating of the batteries and avoiding an undervoltage problem due to too low battery level after self-heating.

Figure 11:
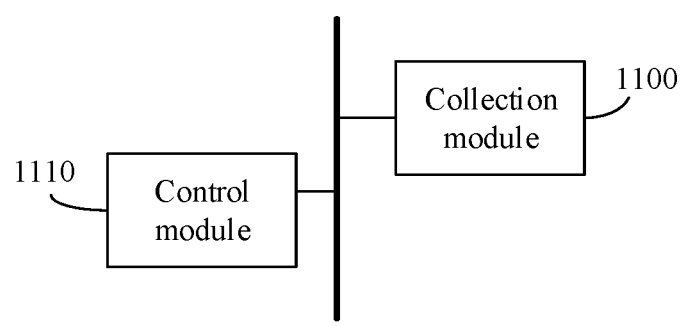
FIG. 11 is a schematic structural diagram of a battery heating control apparatus of some embodiments of this application.

FIG. 11 illustrates a schematic structural block diagram of a battery heating control apparatus provided by this application. It is to be understood that the apparatus corresponds to the method embodiments executed in FIG. 2 to FIG. 10 and is capable of executing the steps involved in the method. Specific functions of the apparatus may be found in the above description. To avoid repetition, detailed description is properly omitted. The apparatus includes at least one software function module capable of being stored in a memory in form of software or firmware or being hardcoded in an operating system (OS) of the apparatus. Specifically, the apparatus includes: a collection module 1100, configured to collect a battery parameter of a battery module; and a control module 1110, configured to: when the battery parameter of the battery module meets a preset heating condition, control a traction battery and a feed battery of the battery module to charge and discharge each other so that the battery module is heated through mutual charge and discharge of the traction battery and the feed battery; and control the traction battery of the battery module to power a motor of a vehicle so that the vehicle runs.

In the technical solution of the embodiments of this application, when the battery parameter of the battery module meets the preset heating condition, the traction battery and the feed battery of the battery module are controlled to charge and discharge each other. As the traction battery and the feed battery both have internal resistance, the mutual charge and discharge of the traction battery and the feed battery causes their internal resistance to produce thermal energy so as to heat the battery module. In addition, with this solution, during battery heating, the traction battery is used to power the motor of the vehicle so that the vehicle can still run. That is, the technical solution provides a scheme of battery self-heating during vehicle driving, resolving the present problem of poor convenience of vehicle use in low temperature environments due to the need to heat batteries in advance. The safety of vehicle use in low temperature environments is guaranteed while the convenience of vehicle use is also improved.

According to some embodiments of this application, optionally, the control module 1110 is specifically configured to: control one of the traction battery and the feed battery of the battery module to discharge to an energy storage element so as to charge the energy storage element; and control the energy storage element to charge the other one of the traction battery and the feed battery.

According to some embodiments of this application, optionally, the control module 1110 is further specifically configured to: obtain a discharge effective value of the traction battery and a discharge effective value of the feed battery; calculate a traction discharge duration corresponding to the traction battery and a feed discharge duration corresponding to the feed battery based on the discharge effective value of the traction battery and the discharge effective value of the feed battery; during discharging of the traction battery, control the traction battery to release electric energy for the traction discharge duration; and during discharging of the feed battery, control the feed battery to release electric energy for the feed discharge duration.

According to some embodiments of this application, optionally, the control module 1110 is further specifically configured to: obtain a motor feed current and an initial discharge effective value of the feed battery; calculate a discharge adjustment value for the feed battery based on the motor feed current and the initial discharge effective value of the feed battery; and during discharging of the feed battery, adjust a discharge current of the feed battery based on the discharge adjustment value.

According to some embodiments of this application, the control module 1110 is further configured to: when temperature of the battery module meets a temperature requirement, control the traction battery and the feed battery of the battery module to stop charging and discharging.

According to some embodiments of this application, the control module 1110 is further configured to: when a voltage difference between the traction battery and the feed battery is not in a preset threshold range, control one of the traction battery and the feed battery with a higher voltage to discharge to the other one of the traction battery and the feed battery with a lower voltage; and the control module 1110 is further configured to: when determination is made in real time that the voltage difference between the traction battery and the feed battery is not in the preset threshold range, continue controlling the discharge process; and when determination is made in real time that the voltage difference between the traction battery and the feed battery is in the preset threshold range, stop the discharge process.

According to some embodiments of this application, the control module 1110 is further configured to: control the traction battery and the feed battery of the battery module to be connected in series reversely, where the traction battery and the feed battery of the battery module are connected in parallel under a non-heating condition to power the motor.

Figure 12:
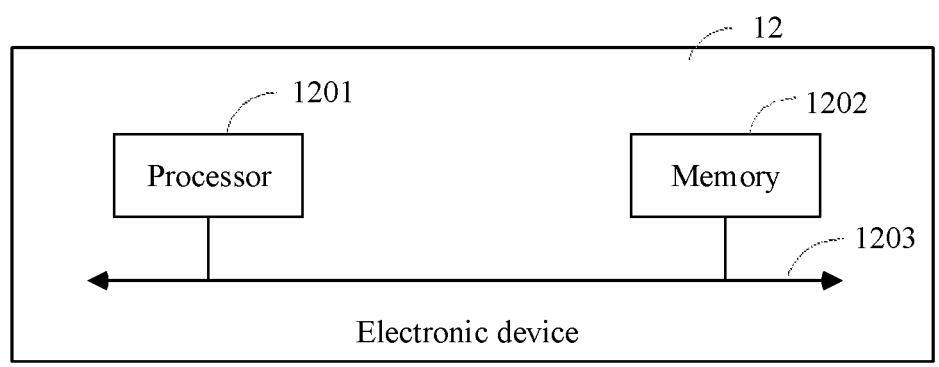
FIG. 12 is a schematic structural diagram of an electronic device of some embodiments of this application.

According to some embodiments of this application, as shown in FIG. 12, this application provides an electronic device 12 including a processor 1201 and a memory 1202, where the processor 1201 and the memory 1202 are interconnected and intercommunicate through a communication bus 1203 and/or other forms of connecting structures (not shown). The memory 1202 stores a computer program executable by the processor 1201. When a computer device runs, the processor 1201 executes the computer program, so as to execute the method executed by a controller in any alternative implementation, for example, executing S200 to S220: collecting a battery parameter of a battery module; when the battery parameter of the battery module meets a preset heating condition, controlling a traction battery and a feed battery of the battery module to charge and discharge each other; and controlling the traction battery of the battery module to power the motor of the vehicle.

This application provides a computer readable storage medium having a computer program stored therein, where the method in any alternative implementation is executed when the computer program is executed by a processor.

The storage medium may be implemented by any type of volatile or non-volatile memory devices, or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

This application provides a computer program product. When run on a computer, the computer program product enables the computer to execute the method in any alternative implementation.

Figure 13:
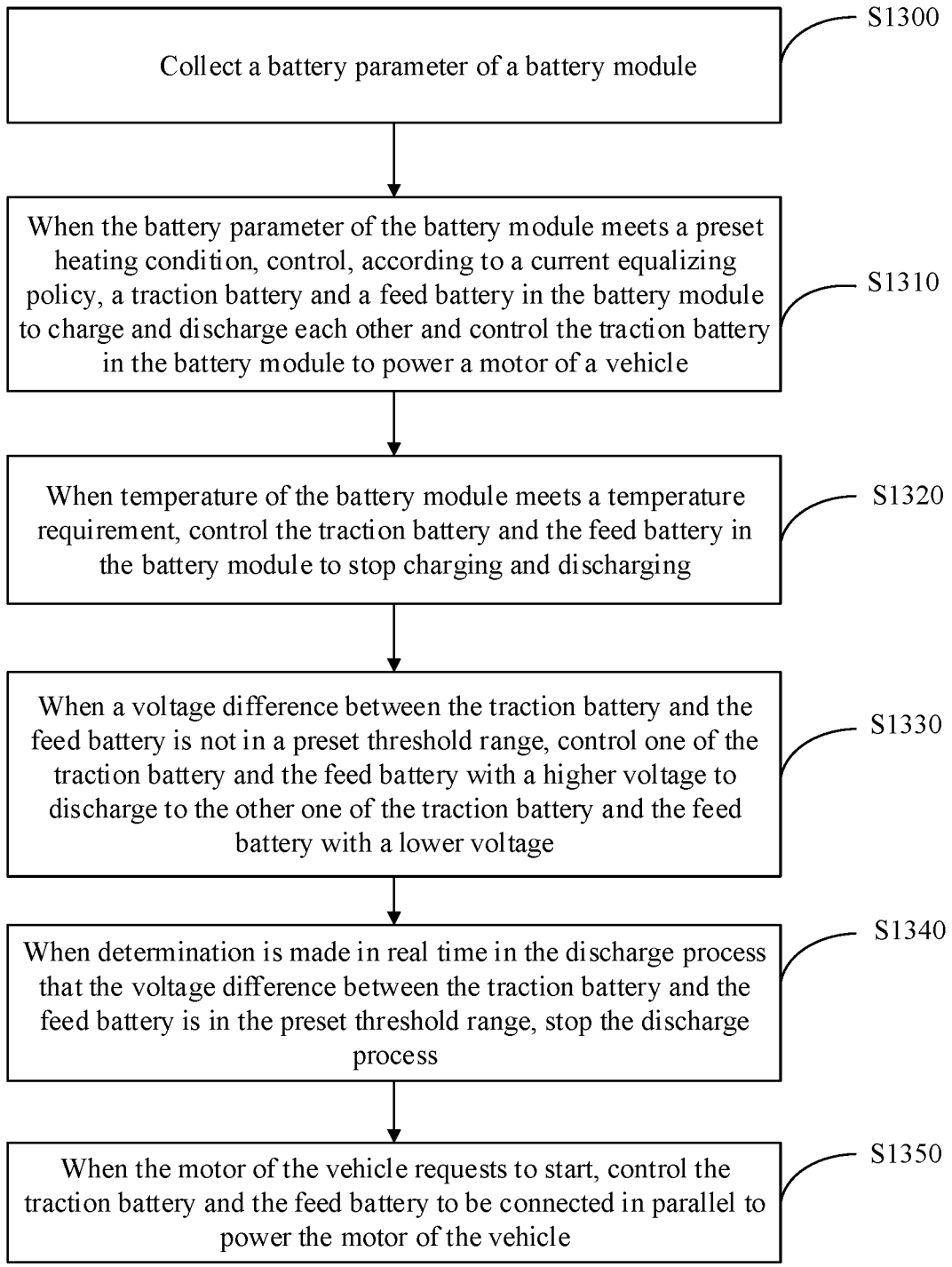
FIG. 13 is a flowchart of an example battery heating control method of some embodiments of this application.

According to some embodiments of this application, referring to FIG. 13 which shows an embodiment of the technical solution, self-heating of batteries during driving of a vehicle may be performed with current and voltage of the batteries equalized in the self-heating process, including:

S1300: Collect a battery parameter of a battery module.

S1310: When the battery parameter of the battery module meets a preset heating condition, control, according to a current equalizing policy, a traction battery and a feed battery of the battery module to charge and discharge each other and control the traction battery of the battery module to power the vehicle.

S1320: When temperature of the battery module meets a temperature requirement, control the traction battery and the feed battery of the battery module to stop charging and discharging.

S1330: When a voltage difference between the traction battery and the feed battery is not in a preset threshold range, control one of the traction battery and the feed battery with a higher voltage to discharge to the other one of the traction battery and the feed battery with a lower voltage.

S1340: When determination is made in real time in the discharge process that the voltage difference between the traction battery and the feed battery is in the preset threshold range, stop the discharge process, and go to S1350.

S1350: When the motor of the vehicle requests to start, control the traction battery and the feed battery to be connected in parallel to power the motor of the vehicle.

The above process has been described in the above description of embodiments, which is not repeated herein. It is to be noted that the current equalizing policy in S1320 refers to a means of equalizing current of the feed battery and the traction battery by way of prolonging the discharge duration of the feed battery or increasing the discharge current, which is not further described herein.

In conclusion, it should be noted that the above embodiments are merely intended for describing the technical solutions of this application but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. Such modifications and replacements all fall within the scope of the claims and specification of this application. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A battery heating control method, comprising:
collecting a battery parameter of a battery module;
in response to the battery parameter of the battery module meeting a preset heating condition, controlling a traction battery and a feed battery of the battery module to charge and discharge each other so that the battery module is heated through mutual charge and discharge of the traction battery and the feed battery; and controlling the traction battery of the battery module to power a motor of a vehicle, wherein controlling the traction battery and the feed battery of the battery module to charge and discharge each other comprises:

obtaining a motor feed current and an initial discharge effective value of the feed battery;

calculating a discharge adjustment value for the feed battery based on the motor feed current and the initial discharge effective value of the feed battery; and during discharging of the feed battery, adjusting a discharge current of the feed battery based on the discharge adjustment value.

2. The method according to claim 1, wherein controlling the traction battery and the feed battery of the battery module to charge and discharge each other comprises:

obtaining a discharge effective value of the traction battery and a discharge effective value of the feed battery;

calculating a traction discharge duration corresponding to the traction battery and a feed discharge duration corresponding to the feed battery based on the discharge effective value of the traction battery and the discharge effective value of the feed battery;

during discharging of the traction battery, controlling the traction battery to release electric energy for the traction discharge duration; and during discharging of the feed battery, controlling the feed battery to release electric energy for the feed discharge duration.

3. The method according to claim 1, further comprising, after controlling the traction battery and the feed battery of the battery module to charge and discharge each other:

in response to a temperature of the battery module meeting a temperature requirement, controlling the traction battery and the feed battery of the battery module to stop charging and discharging.

4. The method according to claim 3, further comprising, after controlling the traction battery and the feed battery of the battery module to stop charging and discharging:

in response to a voltage difference between the traction battery and the feed battery being not in a preset threshold range, controlling one of the traction battery and the feed battery with a higher voltage to discharge to another one of the traction battery and the feed battery with a lower voltage;

in response to a determination in real time in the discharge process that the voltage difference between the traction battery and the feed battery is not in the preset threshold range, continuing the discharge process; and in response to a determination in real time in the discharge process that the voltage difference between the traction battery and the feed battery is in the preset threshold range, stopping the discharge process.

5. The method according to claim 4, further comprising, after stopping the discharge process:

in response to the motor of the vehicle requesting to start, controlling the traction battery and the feed battery to be connected in parallel to power the motor of the vehicle.

6. The method according to claim 1, wherein the battery parameter comprises a battery temperature, and the preset heating condition comprises that the battery temperature of the battery module is lower than a preset temperature.

7. The method according to claim 1, wherein the battery parameter comprises a battery temperature and a battery level, and the preset heating condition comprises that the battery temperature of the battery module is lower than a preset temperature and the battery level is higher than a preset battery level.

8. The method according to claim 1, further comprising, before controlling the traction battery and the feed battery of the battery module to charge and discharge each other:

controlling the traction battery and the feed battery of the battery module to be connected in series reversely;

wherein the traction battery and the feed battery of the battery module are connected in parallel under a non-heating condition to power the motor.

9. A battery heating control method, comprising:

collecting a battery parameter of a battery module;

in response to the battery parameter of the battery module meeting a preset heating condition, controlling a traction battery and a feed battery of the battery module to charge and discharge each other so that the battery module is heated through mutual charge and discharge of the traction battery and the feed battery; and controlling the traction battery of the battery module to power a motor of a vehicle, wherein:

controlling the traction battery and the feed battery of the battery module to charge and discharge each other comprises:

controlling one of the traction battery and the feed battery of the battery module to discharge to an energy storage element so as to charge the energy storage element; and controlling the energy storage element to charge another one of the traction battery and the feed battery; and the motor of the vehicle comprises a first motor and a second motor, wherein the traction battery powers the second motor so that the vehicle drives, and a stator inductor of the first motor is the energy storage element.

10. The method according to claim 9, wherein controlling the energy storage element to charge the other one of the traction battery and the feed battery comprises:

after charging of the energy storage element has been completed, controlling the energy storage element to charge the other one of the traction battery and the feed battery.

11. The method according to claim 9, wherein controlling the traction battery and the feed battery of the battery module to charge and discharge each other comprises:

obtaining a discharge effective value of the traction battery and a discharge effective value of the feed battery;

calculating a traction discharge duration corresponding to the traction battery and a feed discharge duration corresponding to the feed battery based on the discharge effective value of the traction battery and the discharge effective value of the feed battery;

during discharging of the traction battery, controlling the traction battery to release electric energy for the traction discharge duration; and during discharging of the feed battery, controlling the feed battery to release electric energy for the feed discharge duration.

12. The method according to claim 9, further comprising, after controlling the traction battery and the feed battery of the battery module to charge and discharge each other:

in response to a temperature of the battery module meeting a temperature requirement, controlling the traction battery and the feed battery of the battery module to stop charging and discharging.

13. The method according to claim 9, wherein the battery parameter comprises a battery temperature, and the preset heating condition comprises that the battery temperature of the battery module is lower than a preset temperature.

14. The method according to claim 9, wherein the battery parameter comprises a battery temperature and a battery level, and the preset heating condition comprises that the battery temperature of the battery module is lower than a preset temperature and the battery level is higher than a preset battery level.

15. The method according to claim 9, further comprising, before controlling the traction battery and the feed battery of the battery module to charge and discharge each other:

controlling the traction battery and the feed battery of the battery module to be connected in series reversely;

wherein the traction battery and the feed battery of the battery module are connected in parallel under a non-heating condition to power the motor.

16. An electronic device, comprising:

a memory storing a computer program; and a processor configured to execute the computer program to:

collect a battery parameter of a battery module;

in response to the battery parameter of the battery module meeting a preset heating condition, control a traction battery and a feed battery of the battery module to charge and discharge each other so that the battery module is heated through mutual charge and discharge of the traction battery and the feed battery; and control the traction battery of the battery module to power a motor of a vehicle, wherein controlling the traction battery and the feed battery of the battery module to charge and discharge each other comprises:

obtaining a motor feed current and an initial discharge effective value of the feed battery;

calculating a discharge adjustment value for the feed battery based on the motor feed current and the initial discharge effective value of the feed battery; and during discharging of the feed battery, adjusting a discharge current of the feed battery based on the discharge adjustment value.

\* \* \* \* \*